United States Patent Office 3,218,432
Patented Nov. 16, 1965

3,218,432
NICKEL STEEL FILLER WIRE
James V. Peck, Union, N.J., assignor to The International Nickel Company, Inc., New York, N.Y., a corporation of Delaware
No Drawing. Filed June 28, 1963, Ser. No. 291,236
18 Claims. (Cl. 219—137)

The present invention relates to welding material for producing welds and weldments having good low temperature service properties and characteristics and, more particularly, to ferritic steel welding wire of special composition for use in gas shielded-arc processes for the producing of welds having high toughness at very low temperatures.

Ferritic steel containing about 9% nickel has been known for at least about 20 years. Standard specifications including ASTM Specification A 353–58 and ASME Boiler Code and Pressure Vessel Committee Code Case 1308 have been prepared and are publicly available in regard to this material. This steel has achieved a very substantial acceptance in the art as a material which is particularly useful in the construction of vessels and other equipment intended for use at very low temperatures. As an example, containers for liquefied gas, e.g., liquid nitrogen, liquid oxygen, etc., may be produced from 9% nickel steel plate and such vessels are found to have extremely useful properties in this service. As a practical matter, it is necessary to weld sections of 9% nickel steel plate together in order to produce a vessel or container therefrom. In usual practice, when the container is spherical or cylindrical in shape, the plate segments from which it is to be constructed are first formed to shape and then are welded along the edges thereof to form the vessel desired.

Many vessels and other equipment used in service at very low temperatures such as minus 320° F. have been constructed from 9% nickel steel. These vessels and other equipment have been welded in the main with a nickel base filler material containing about 15% chromium, about 7% iron and the balance essentially nickel.

Welds produced using such a material are entirely satisfactory from the standpoint of weld soundness, freedom from porosity and resistance to cracking and have excellent impact resistance at very low temperatures. However, the welds produced using such filler materials suffer from the disadvantage that the tensile properties of the nickel base alloy weld (about 90,000 p.s.i. tensile strength) are lower than the tensile properties of the quenched and tempered 9% nickel steel plate which in many cases is on the order of about 120,000 p.s.i. This means that the full strength properties of the 9% nickel steel plate material cannot be utilized in the construction of a welded vessel since the overall strength of the welded structure vessel is limited by the strength of the welds themselves. This factor necessitates the use of heavier plate than would be necessary if the welds were as strong as the plate material. Furthermore, the nickel base alloy welding material is quite expensive. The art, accordingly, has been demanding that a ferritic material be made available for the welding of 9% nickel steel not only from the standpoint of economy in price of the welding material itself but also from the standpoint that it would be highly desirable to provide a welding material that would yield a weld having essentially the strength of the plate material and at the same time provide a weld having satisfactory impact resistance at cryogenic temperatures such as minus 320° F. and lower.

Prior attempts to provide a ferritic nickel steel welding material having a composition matching that of the plate have been unsuccessful as it has been found that the welds produced using such material are subject to cracking and even when the resulting welds apparently are sound it has been found that the welds have very low impact resistance at cryogenic temperatures such as minus 320° F.

A welding material having a special ferritic nickel steel composition has now been discovered which will produce sound, strong welds having a standard Charpy V-notch impact resistance of at least 25 foot-pounds at minus 320° F. and having 100% joint efficiency when used as a filler metal in gas-shielded arc-welding processes.

It is an object of the present invention to provide a special ferritic steel composition for use as a filler wire in gas-shielded arc- welding processes in order to produce welds having high strength together with high toughness at cryogenic temperatures.

It is a further object of the invention to provide a method of welding 9% nickel steel with a special ferritic filler wire composition by a gas-shielded arc-welding process to produce welds having a ferritic composition and having high strength, 100% joint efficiency together with high toughness at cryogenic temperatures.

It is a further object of the invention to provide special cast nickel steel compositions having high strength and having high toughness at cryogenic temperatures.

Further objects and advantages will become apparent from the following description.

Broadly stated, the present invention contemplates a welding material for use in gas-shielded arc-welding processes to produce welds having high strength and high toughness at cryogenic temperatures, e.g., temperatures on the order of minus 320° F., consisting of a special nickel steel composition containing by weight about 11.5% to 13.5% nickel, about 0.03% to 0.07% carbon, about 0.5% to 0.8% manganese, about 0.01% to 0.05% aluminum, up to about 0.05% titanium, not more than about 0.05% and advantageously not more than about 0.02% silicon, not more than 0.01% phosphorus, not more than 0.01% sulfur, not more than 0.02% oxygen, not more than 0.01% nitrogen, not more than 0.0003% hydrogen, balance iron. Welding wire having a composition within the foregoing range when used as the filler metal in gas-shielded arc-welding using as the inert shielding gas helium or argon will provide strong, tough welds in 9% nickel steel which welds will have a standard Charpy V-notch impact exceeding 25 foot-pounds at minus 320° F. as determined using Charpy V-notch impact specimens (E23–41T) machined transverse to the major axis of the weld joints with the notch located in the center of the weld and running in a direction perpendicular to the plate surface. These welds also demonstrate 100% joint efficiency in commercial 9% nickel steel plate which has been given a standard mill heat treatment. Particularly advantageous filler wire compositions contemplated in accordance with this invention contain about 12.5% nickel, about 0.05% carbon, about 0.65% manganese, about 0.02% aluminum, not more than 0.05% titanium, not more than 0.01% silicon, not more than 0.005% phosphorus, not more than 0.005% sulfur, not more than 0.01% oxygen, not more than 0.005% nitrogen, not more than 0.0002% hydrogen, balance iron.

It is important, in accordance with the concepts of the present invention, that all of the elements in the special filler wire composition contemplated in accordance with the invention be present in the ranges set forth hereinbefore. It has been found that the ingredients recited hereinbefore must not be present in amounts less than the minimum amounts set forth or in amounts exceeding the maximum amounts set forth hereinbefore. Thus, the nickel content of the welding materials is important since it is found that welds produced from welding material containing nickel in the range of 11.5% to 13.5% provide 100% fibrous fracture in the Charpy V-notch test whereas welds produced using an otherwise identical material containing only 9% nickel yielded a brittle fracture in the Charpy V-notch test and this is taken as an undesirable indication even when the Charpy values are of a satisfactory order. On the other hand, nickel in amounts exceeding about 13% tends to provide an unsatisfactory low yield strength in resulting welds. The role of carbon in the welding material is not well understood but it has been observed that welds made using filler wires containing less than 0.03% carbon were less tough at minus 320° F. than welds made using compositions having carbon in the range of 0.03% to 0.07%, and more advantageously, 0.05% to 0.07%. In addition, it was found that the cracking in the weld metal occurred when filler wires containing more than 0.07% carbon were employed.

Silicon is a particularly important element which in most instances must be controlled such that it does not exceed 0.02% (200 parts per million) in the special welding material provided in accordance with the invention since it has been found that greater amounts of silicon promote weld cracking particularly in weld beads which are highly diluted with commercial 9% nickel steel plate material having a high sulfur content. It has been observed that silicon in the weld metal in combination with sulfur exerts a deleterious effect in an undesirable synergistic fashion. In certain instances, when the sulfur content of the welding material is very low (not over 0.005%) silicon is amounts up to 0.05% or possibly even 0.10% may be tolerated, but it is always beneficial to maintain silicon in the welding material to the lowest possible level. Manganese is also important and in the ranges required it provides necessary deoxidation of the molten weld pool. Aluminum is also an important element in the composition and in the required amounts specified hereinbefore appears to perform a deoxidation function in the filler wire melt itself and also in the molten weld pool produced using this filler wire. On the other hand, excessive levels of aluminum in the weld material produces lower toughness in the weld possibly through the precipitation of embrittling aluminum nitride in the grain boundaries. Accordingly, it is advantageous to limit the aluminum content of the welding material to a maximum of about 0.03%.

Phosphorus and sulfur are both harmful trace impurities which contribute to cracking in the weld and which singly or together produce a sharp decline in weld toughness when these elements are present in amounts greater than 0.01% each in the filler material. In order to provide an even greater margin of safety in regard to weld properties, bearing in mind the fact that commercial 9% nickel steel plate offers a potential hazard via dilution into the weld, it is highly desirable to maintain phosphorus and sulfur in amounts not exceeding 0.005% each in the special welding material provided in accordance with the present invention.

Oxygen is a particularly deleterious gaseous impurity which cannot be tolerated in amounts exceeding 200 parts per million in the welding material. It is highly desirable that the oxygen content of the welding material be maintained as low as possible, e.g., 100 parts per million or lower (0.01% or lower), since amounts of oxygen present either as oxides or in solution in excess of 200 parts per million in the welding material produce a serious drop in weld notch toughness at minus 320° F.

In view of the problem created when oxygen is present in the weld material, it is advantageous to employ vacuum melting in preparing the welding material along with aluminum deoxidation. Vacuum melting is particularly advantageous when small melts are to be prepared. The gaseous impurities nitrogen and hydrogen also are to be controlled to the low levels set forth hereinbefore since nitrogen is believed to have an embrittling effect in the weld material and hydrogen has a seriously deleterious effect in the standard side bend tests employed as indicia of acceptability for welds produced using the special welding material provided in accordance with this invention.

It is important in producing welds by the inert-gas shielded-arc process in accordance with the present invention that argon or helium of low dew point and high purity be employed. As those skilled in the art will appreciate, it is also important to observe normal precautions in weld geometry and to employ good welding techniques including a sufficient shielding gas flow rate so as to avoid excessive dilution of the weld material by the base plate.

An advantageous process particularly for out-of-position welding using the welding material of the present invention is the so-called "short arc" or "fine wire" or "dip transfer" process such as is described in an article by T. McElrath in the October 1960 issue of the Welding Journal at pages 1044–1050. It is advantageous to include in the special welding material contemplated by the present invention when it is intended for use in this process, a small titanium content of up to about 0.15%, e.g., about 0.05% to 0.15%. Titanium is not usually employed in amounts exceeding about 0.05% in welding material for inert-gas shielded tungsten-arc or metal-arc welding.

It has been established that when the special welding material contemplated in accordance with this invention is employed as the core wire in a covered electrode using as a flux a standard flux composition for welding steel or when it is used in submerged-arc welding using standard flux compositions, unsatisfactory results are obtained and, in particular, the impact resistance of resulting welds at minus 320° F. is unsatisfactory.

In order to give those skilled in the art a better understanding of the invention, the following illustrative examples are set forth hereinafter.

*Example I*

Seven melts of welding material having compositions set forth in the following table were made by vacuum melting:

TABLE I

|  | Alloy No. 1 | Alloy No. 2 | Alloy No. 3 | Alloy No. 4 | Alloy No. 5 | Alloy No. 6 | Alloy No. 7 |
|---|---|---|---|---|---|---|---|
| Percent Element: | | | | | | | |
| Carbon | 0.06 | 0.05 | 0.05 | 0.04 | 0.04 | 0.05 | 0.05 |
| Silicon | 0.01 | 0.042 | 0.025 | 0.012 | 0.012 | 0.01 | 0.010 |
| Manganese | 0.62 | 0.62 | 0.62 | 0.60 | 0.59 | 0.59 | 0.60 |
| Nickel | 12.35 | 13.02 | 12.50 | 12.25 | 12.23 | 12.30 | 12.17 |
| Aluminum | 0.015 | 0.03 | 0.017 | 0.051 | 0.01 | 0.011 | 0.015 |
| Phosphorus | <0.001 | 0.002 | 0.005 | 0.002 | 0.001 | 0.003 | 0.004 |
| Sulfur | 0.003 | 0.0013 | 0.002 | 0.002 | 0.003 | 0.002 | 0.002 |
| P.P.M. Element: | | | | | | | |
| Oxygen | 28 | 30 | 70 | 70 | 70 | 50 | 50 |
| Nitrogen | N.D. | N.D. | 10 | 5 | 10 | 8 | 9 |
| Hydrogen | 1.5 | 1.4 | 3 | 1 | 1 | 1 | 1 |

Note.—No titanium was added to these melts.
N.D.=Not Detected.
P.P.M.=Parts Per Million.

In each instance, the melt was cast into an ingot, and the ingot was forged and reduced to provide wire about 5/32 inch in diameter.

*Example II*

Seven butt welds were prepared by the inert-gas tungsten-arc process between plates ½ inch thick by 5 inches by 5 inches of a commercial 9% nickel steel using as filler wire the materials produced according to Example I. The steel plates were in the mill normalized and tempered condition, had a hardness of about 20 Rockwell "C" and contained about 0.010% carbon, about 0.49% manganese, about 0.01% phosphorus, about 0.024% sulfur, about 0.22% silicon, about 8.8% nickel and the balance essentially iron. The plates were prepared by machining a 5 inch edge of each of the two joint members into a standard single V-groove configuration. The joint provided an 80° angle between the members with a 1/16 inch root face and a ⅛ inch root space. The two plates in each instance were then centered over a grooved copper backing bar which was perforated to allow inert-gas shielding of the underside of the root weld bead. The entire assembly was restrained to a steel welding bench by four heavy-duty C-clamps to prevent distortion during welding and afford maximum restraint. The joints were welded in the flat position without preheat using 12 passes, manually controlled, at about 200 amperes direct current straight polarity. Maximum interpass temperature of 250° F. was maintained throughout the welding of the joint. The welding torch was fitted with a ⅛ inch diameter thoriated tungsten electrode. Arc shielding was provided by weld-in grade argon flowing at about 20 cubic feet per hour. Root shielding was provided by welding grade argon at 4 cubic feet per hour. The completed joints were radiographed at 2% sensitivity and no cracks or oxide inclusions were observed. A few very small finely scattered pores were observed but the level of soundness was well above that required by the standard pressure vessel codes. The welds had a hardness of about 32 Rockwell "C."

Standard Charpy V-notch impact test specimens (ASTM E23–41T) were machined transverse to the major axis of the joints with the notch located in the center of the weld, running perpendicular to the plate surface. Impact tests were conducted on the as-welded material at minus 320° F. using three specimens per weld with the following results:

TABLE II

| Weld No. | Filler Metal Alloy No. | Impact Energy (Ft. Lbs.) | | |
|---|---|---|---|---|
| 1 | 1 | 29.5 | 30 | |
| 2 | 2 | 59.5 | 54.5 | 31 |
| 3 | 3 | 67.0 | 70.0 | 69.0 |
| 4 | 4 | 34.0 | 37.0 | 34.5 |
| 5 | 5 | 41.0 | 47.0 | 44.0 |
| 6 | 6 | 67.0 | 60.0 | 65.0 |
| 7 | 7 | 64.0 | 55.0 | 57.0 |

The fracture surfaces of the broken Charpy specimens were characteristically ductile, i.e., 100 percent fibrous, with at least 20 mils of lateral expansion at the base of the fracture.

These joints demonstrated that good low temperature toughness very substantially in excess of Boiler Code requirements can be consistently achieved in as-welded low-carbon martensite weld deposits using the filler wires of this invention.

*Example III*

A series of seven butt welds were prepared by the manual inert-gas metal-arc process using as the consumable electrode materials the filler wires produced as described in Example I hereinbefore. Plates of commercial 9% nickel steel having the same composition and thermal history as that set forth in Example II hereinbefore were used. In each case, plates ½ inch thick by 5 inches by 10 inches were employed to produce the butt welds. Weld joints were prepared by machining a 10 inch edge of each of the two members with a standard single V-groove configuration. This joint design provided an 80° angle between the members, a 1/16 inch root face and a 1/16 inch root space.

The joint was centered over a grooved copper backing plate recessed in a 6 inch thick steel welding bench. The joint members were held in position to the steel welding bench by four heavy-duty U-strap clamps.

The joints were welded in the flat position without preheat in 8 passes (with the exception of Weld No. 8, which was made in 4 passes) and a maximum interpass temperature of 250° F. was maintained. All weld beads were deposited manually at about 300 amperes, 30 volts direct current reversed polarity using a gas metal-arc torch with argon shielding gas flowing at 50 cubic feet per hour. No root sealing beads were deposited in the bottom of the joints because of the adequate penetration of the first pass deposited from the top side.

The completed joints were radiographed to 2 percent sensitivity and found to be free of cracking, inclusions and objectionable porosity.

Two ⅜ inch wide transverse cross-sections cut from each weld were bent, with the cross section parallel to the bending plane, around a 1½ inch diameter steel pin until the ends of the specimens were about parallel (180° bend). The bent specimens were examined at 30 diameters magnification and were found to be satisfactory.

Transverse Charpy V-notch impact specimens were then machined from the joints with the notch located in the center of the weld perpendicular to the plate surface. Impact tests conducted at minus 320° F. in the as-welded condition yielded the following results:

TABLE III

| Weld No. | Filler Metal Alloy No. | Minus 320° F. V-Notch Impact Energy (Ft. Lbs.) | | |
|---|---|---|---|---|
| 8 | 1 | 27 | 33 | 29.5 |
| 9 | 2 | 26 | 26.5 | 26 |
| 10 | 3 | 43.5 | 40.5 | 47.0 |
| 11 | 4 | 54.0 | 54.0 | 56.5 |
| 12 | 5 | 32.0 | 34.0 | 37.0 |
| 13 | 6 | 48.0 | 54.0 | 51.0 |
| 14 | 7 | 49.0 | 48.0 | 49.0 |

The fracture appearance of all impact specimens was 100 percent fibrous with at least 20 mils lateral expansion at the base of the fracture surfaces.

Three of the joints (Welds 10, 11 and 12) were machined to provide 0.357 inch diameter all-weld metal tensile specimens. Tensile tests were conducted at room temperature on specimens in the as-welded condition using a conventional rate of tensile loading (0.025 inch/inch/min. cross-head travel). The results of the tensile tests are given below:

TABLE IV

| Weld No. | 0.2% Y.S. (p.s.i.) | U.T.S. (p.s.i.) | Percent Elong. (1.4″) | Percent R.A. |
|---|---|---|---|---|
| 10 | 120,800 | 141,800 | 15.7 | 57.5 |
| 11 | 118,000 | 131,000 | 18.6 | 62.5 |
| 12 | 112,600 | 131,900 | 13.6 | 52.5 |

The tensile values indicate that the filler wire of the invention deposits weld metal with as-welded strengths exceeding those of unwelded plate. Again, the hardness of the weld was about 32 Rockwell "C."

*Example IV*

Two heats of welding material having the composition set forth in the following table were prepared by vacuum melting:

TABLE V

| Element | Alloy No. 8 | Alloy No. 9 |
|---|---|---|
| Carbon, percent | 0.06 | 0.05 |
| Silicon, percent | <0.01 | <0.01 |
| Manganese, percent | 0.61 | 0.59 |
| Nickel, percent | 12.80 | 12.50 |
| Aluminum, percent | 0.039 | 0.01 |
| Phosphorus, percent | 0.004 | 0.002 |
| Sulphur, percent | 0.003 | 0.003 |
| Titanium, percent | 0.10 | 0.12 |
| Oxygen, p.p.m | 25.5 | 31.4 |
| Nitrogen | ¹ N.D. | ¹ N.D. |
| Hydrogen, p.p.m | 1.3 | 2.4 |

¹ N.D.=Not Detected.

The welding material in each case was prepared as a 0.030 inch diameter wire. Two butt welds were made by the short-arc (fine-wire) process between plates of 9% nickel steel having the same composition as that set forth in Example II hereinbefore. The plates were ½ inch thick by 5 inches square. In each case, the weld joints were prepared by machining a 5 inch edge of each of the two joint members with a standard single V-groove configuration. This joint design provided an 80° angle between the members, a 1/16 inch root face and a 1/8 inch root space. The joints were then centered over a grooved copper backing bar which was perforated to allow inert-gas shielding of the underside of the root weld bead. This root shielding was provided by welding grade argon at 4 cubic feet per hour. The entire assembly was restrained to a steel welding bench by four heavy-duty C-clamps to prevent distortion during welding and afford maximum restraint.

The joints were welded in the flat position, without preheat in 18 to 20 passes using the short-arc (fine-wire) process, manually controlled, at about 120 amperes, 27 volts direct current reversed polarity. A maximum interpass temperature of 300° F. was maintained throughout the welding of the joint. Welding grade helium flowing at about 50 cubic feet per hour was used for arc welding.

The completed joints were radiographed to 2 percent sensitivity and no cracks or oxide inclusions were observed. A few small well scattered pores were observed, but the levels of soundness were well above that required by the standard pressure vessel code.

Standard Charpy V-notch impact specimens were machined transverse to the major axis of the joints with the notch located in the center of the weld, perpendicular to the plate surfaces. Impact tests, three per weld, were conducted on as-welded material at minus 320° F. The results are as follows:

TABLE VI

| Weld No. | Filler Metal Alloy No. | Impact Energy (Ft-Lbs) | | |
|---|---|---|---|---|
| 15 | 8 | 34.0 | 35.0 | 36.0 |
| 16 | 9 | 45.0 | 45.0 | 42.0 |

The fracture surfaces of the broken Charpy specimens were ductile as characterized by at least 80 percent fibrous fracture with at least 20 mils of lateral expansion at the base of the fracture.

Two ⅜ inch wide transverse cross-sections cut from each weld were bent, with cross-section parallel to the bending plane, around a 1½ inch diameter steel pin until the ends of the specimens were about parallel (180° bend). The bent specimens were examined at 30 diameters magnification and were found to be satisfactory.

It has been pointed out hereinbefore that 100% joint efficiency is developed in joining 9% nickel steel plate material in accordance with the invention. This means that specimens cut transverse to the direction of the weld so as to include the weld and plate material on both sides thereof fail in tension in the plate material. For example, a standard tensile specimen cut transversely from a weld made in an identical manner and at the same time as Weld No. 1 has the following properties:

Tensile strength _____ k.s.i. __ 111.8
Yield strength (0.2% off-set) _____ do ____ 90.9
Elongation _____ percent __ 14.3
Reduction in area _____ do ____ 65

Fracture of the specimen was in the plate material well removed from the weld and from the heat-affected zone.

It is to be understood that the weld metal produced in accordance with the invention has a very complex micro-structure which is believed to be low-carbon martensite with traces of ferrite, bainite and austenite. Low-carbon martensite is identified in the as-deposited weld metal structure when it is viewed in the optical microscope. When the as-deposited weld metal structure is examined by X-ray diffraction means, it is found to be composed primarily of body-centered cubic (ferritic) material and there is an indication of face-centered cubic (austenitic) material when the nickel content of the weld metal is about 11.5% or higher. A stress-relieving heat treatment of the weld metal at 1050° F. for a time period of about 2 hours per inch of section appears to increase the amount of austenite present in the weld metal structure as revealed by X-ray diffraction to a level on the order of approximately 5%. This change in structure is accompanied in weld metal resulting from multiple-pass welds by an increase in standard Charpy V-notch impact values of about 5 to 10-foot-pounds at minus 320° F., by an increase in room temperature ductility values as measured in the tensile test and by a reduction in room temperature yield strength and tensile strength. The increase in impact value resulting from stress-relief is of such a small order that it is unnecessary to employ a stress-relieving heat treatment to insure a standard Charpy V-notch impact value of at least about 25 foot-pounds in welds produced according to the invention.

Weld deposits produced in accordance with the invention will have cast nickel steel compositions as shown in the following table:

TABLE VII

| Element | Range, Percent | Preferred Composition, Percent |
|---|---|---|
| Iron | Balance | Balance. |
| Nickel | 11.5 to 13.5 | 12.5. |
| Carbon | 0.03 to 0.07 | 0.06. |
| Manganese | 0.4 to 0.8 | 0.65. |
| Aluminum | 0.03 Max | 0.02 Max. |
| Titanium | 0.03 Max | 0.01 Max. |
| Silicon | 0.10 Max | 0.05 Max. |
| Phosphorus | 0.01 Max | 0.005 Max. |
| Sulfur | 0.01 Max | 0.005 Max. |
| Oxygen | 0.015 Max | 0.01 Max. |
| Nitrogen | 0.010 Max | 0.005 Max. |
| Hydrogen | 0.0005 Max | 0.0003 Max. |

It is to be further understood that the welding material provided in accordance with the invention is of particular value for producing joints in steel having the composition defined in ASTM Standard Specification A 353–58, i.e., commercial steel containing about 8.4% to 9.6% nickel, about 0.13% to 0.32% silicon, 0.040% max. sulfur, 0.035% max. phosphorous, 0.90% max. manganese, 0.13% max. carbon, balance iron. Steels containing about 8% to about 13% nickel, up to about 0.32% silicon, up to about 0.04% sulfur, up to about 0.035% phosphorus, up to about 0.13% carbon, up to about 0.9% manganese, balance iron can also be successfully welded in accordance with the invention to produce weld joints having a standard Charpy V-notch impact value of at least 25 foot-pounds at minus 320° F. and which will have 100% joint efficiency. Welding of these steels in accordance with the invention is unaffected by the prior thermal history of the steel.

As previously noted, the ferritic steel filler wire provided in accordance with the invention is useful as such in inert atmosphere shielded fusion-welding processes including metal-arc and tungsten-arc welding processes. It will be appreciated that very thin proprietary emissive coatings which are commercially employed on bare filler wires to promote arc stability and which are almost invisible may be employed with the filler wire provided in accordance with this invention. It will also be understood that a vacuum as well as helium and argon will provide an inert atmosphere. Gas mixtures containing carbon dioxide are unsatisfactory since welds produced using such gases tend to be unsound, apparently because of oxygen pick up from the carbon dioxide.

Although the present invention has been described in conjunction with preferred embodiments, it is to be understood that modifications and variations may be resorted to without departing from the spirit and scope of the invention, as those skilled in the art will readily understand Such modifications and variations are considered to be within the purview and scope of the invention and appended claims.

I claim:

1. A ferritic nickel steel particularly useful as a welding material for inert-gas shielded-arc welding of 9% nickel steel base material which comprises about 11.5% to 13.5% nickel, about 0.03% to about 0.07% carbon, about 0.5% to about 0.8% manganese, about 0.01% to about 0.05% aluminum, up to about 0.05% titanium, not more than about 0.05% silicon, not more than about 0.01% phosphorus, not more than about 0.01% sulfur, not more than about 200 parts per million oxygen, not more than about 100 parts per million nitrogen, not more than about 3 parts per million hydrogen, and the balance iron.

2. A ferritic nickel steel as set forth in claim 1 wherein the oxygen content does not exceed about 100 parts per million.

3. A ferritic nickel steel as set forth in claim 1 wherein the aluminum content does not exceed about 0.03%.

4. A ferritic nickel steel as set forth in claim 1 wherein the silicon content does not exceed about 0.02%.

5. A ferritic nickel steel as set forth in claim 1 wherein the contents of phosphorus and of sulfur do not exceed 0.005% each.

6. A ferritic nickel steel particularly useful as a welding material for inert-gas shielded-arc welding of 9% nickel steel base material which comprises about 11.5% to 13.5% nickel, about 0.03 to 0.07% carbon, about 0.5% to 0.8% manganese, about 0.01% to about 0.05% aluminum, up to about 0.05% titanium, not more than about 0.10% silicon, not more than about 0.01% phosphorus, not more than about 0.005% sulfur, not more than about 200 parts per million oxygen, not more than about 100 parts per million nitrogen, not more than about 3 parts per million hydrogen, and the balance iron.

7. A ferritic nickel steel particularly useful as a welding material for inert-gas shielded-arc welding of 9% nickel steel base material which essentially consists of about 12.5% nickel, about 0.05% carbon, about 0.65% manganese, about 0.02% aluminum, not more than about 0.01% titanium, not more than 0.01% silicon, not more than 0.005% phosphorus, not more than 0.005% sulfur, not more than 100 parts per million oxygen, not more than 50 parts per million nitrogen, not more than 2 parts per million hydrogen, and the balance iron.

8. A ferritic nickel steel having particular utility as a welding material for joining members made of 9% nickel steel base material by the inert-gas shielded short-arc welding process which comprises about 11.5% to about 13.5% nickel, about 0.3% to about 0.07% carbon, about 0.5% to about 0.8% manganese, about 0.01% to about 0.05% aluminum, about 0.05% to 0.15% titanium, not over about 0.05% silicon, not more than about 0.01% phosphorus, not more than about 0.01% sulfur, not more than about 200 parts per million oxygen, not more than about 100 parts per million nitrogen, not more than about 3 parts per million hydrogen, and the balance iron.

9. As a new article of manufacture, a welding filler wire made from the ferritic steel set forth and defined in claim 1.

10. As a new article of manufacture, a welding filler wire made from the ferritic steel set forth and defined in claim 7.

11. A ferritic nickel steel having particular utility as a welding material for joining members made of 9% nickel steel base material by the inert-gas shielded short-arc welding process which comprises about 12.5% nickel, about 0.05% carbon, about 0.65% manganese, about 0.02% aluminum, about 0.05% to 0.15% titanium, not over about 0.01% silicon, not more than 0.005% phosphorus, not more than 0.005% sulfur, not more than 100 parts per million oxygen, not more than 50 parts per million nitrogen, not more than 2 parts per million hydrogen, and the balance iron.

12. A cast nickel steel characterized by a standard Charpy V-notch impact resistance at minus 320° F. in excess of 25 foot-pounds which comprises about 11.5% to 13.5% nickel, about 0.03% to 0.07% carbon, about 0.4% to 0.8% manganese, up to about 0.03% aluminum, not more than 0.03% titanium, not more than 0.10% silicon, not more than 0.01% phosphorus, not more than 0.01% sulfur, not more than 150 parts per million oxygen, not more than 100 parts per million nitrogen, not more than 5 parts per million hydrogen, and the balance iron.

13. A cast nickel steel characterized by a standard Charpy V-notch impact resistance at minus 320° F. in excess of 25 foot-pounds which comprises about 12.5% nickel, about 0.06% carbon, about 0.65% manganese, up to about 0.02% aluminum, not more than 0.01% titanium, not more than 0.05% silicon, not more than 0.005% phosphorus, not more than 0.005% sulfur, not more than 100 parts per million oxygen, not more than 50 parts per millon nitrogen, not more than 3 parts per million hydrogen, and the balance iron.

14. A ferritic nickel steel particularly useful as a welding material for inert-gas shielded-arc welding of 9% nickel steel base material which comprises about 11.5% to 13.5% nickel, about 0.05% to about 0.07% carbon, about 0.5% to about 0.8% manganese, about 0.01% to about 0.05% aluminum, up to about 0.05% titanium, not more than about 0.05% silicon, not more than about 0.01% phosphorus, not more than about 0.01% sulfur, not more than about 200 parts per million oxygen, not more than about 100 parts per million nitrogen, not more than about 3 parts per million hydrogen, and the balance iron.

15. The method for forming weld joints between members of ferritic nickel steel containing about 8% to about 13% nickel which comprises preparing for welding the edges of at least two members of said steel, placing said members in adjacent position for welding, forming an arc between said members, protecting the area around said arc with an inert atmosphere, feeding into said arc a nickel steel filler wire containing about 11.5% to about 13.5% nickel, about 0.03% to about 0.07% carbon, about 0.5% to about 0.8% manganese, about 0.01% to about 0.05% aluminum, up to about 0.05% titanium, not more than about 0.05% silicon, not more than about 0.01% phosphorus, not more than about 0.01% sulfur, not more than about 200 parts per million oxygen, not more than about 100 parts per million nitrogen, not more than about 3 parts per million hydrogen, and the balance iron, moving said arc along the prepared edges of said adjacent members at least once while maintaining said atmosphere to form a weld between said members, said weld being characterized by 100% joint efficiency in the transverse tensile test and by a Charpy V-notch value in the weld metal of at least 25 foot-pounds at minus 320° F.

16. The method for forming weld joints between members of ferritic nickel steel containing about 8% to about 13% nickel which comprises preparing for welding the edges of at least two members of said steel, placing said members in adjacent position for welding, forming an arc between said members, protecting the area around said arc with an inert atmosphere, feeding into said arc a nickel steel filler wire containing about 11.5% to 13.5% nickel, about 0.03% to 0.07% carbon, about 0.5% to 0.8% manganese, about 0.01% to about 0.05% aluminum, up to about 0.05% titanium, not more than about 0.10% silicon, not more than about 0.01% phosphorus, not more than about 0.005% sulfur, not more than about 200 parts per million oxygen, not more than about 100 parts per million nitrogen, not more than about 3 parts per million hydrogen, and the balance iron.

17. The method for forming weld joints between members of ferritic nickel steel containing about 8% to about 13% nickel which comprises preparing for welding the edges of at least two members of said steel, placing said members in adjacent position for welding, forming an arc between said members, protecting the area around said arc with an inert atmosphere, feeding into said arc a nickel steel filler wire containing about 12.5% nickel, about 0.05% carbon, about 0.65% manganese, about 0.02% aluminum, not more than about 0.01% titanium, not more than 0.01% silicon, not more than 0.005% phosphorus, not more than 0.005% sulfur, not more than 100 parts per million oxygen, not more than 50 parts per million nitrogen, not more than 2 parts per million hydrogen, and the balance iron.

18. The method for forming weld joints between members of ferritic nickel steel containing about 8.4% to 9.6% nickel, about 0.13% to 0.32 silicon, not more than about 0.04% sulfur, not more than 0.035 phosphorus, not more than 0.90% manganese, not more than 0.13% carbon, and the balance essentially iron which comprises preparing for welding the edges of at least two members of said steel, placing said members in adjaecnt position for welding, forming an arc between said members, protecting the area around said arc with an inert atmosphere, feeding into said arc a nickel steel filler wire containing about 11.5% to about 13.5% nickel, about 0.03% to about 0.07% carbon, about 0.5% to about 0.8% manganese, about 0.01% to about 0.05% aluminum, up to about 0.05% titanium, not more than about 0.05% silicon, not more than about 0.01% phosphorus, not more than about 0.01% sulfur, not more than about 200 parts per million oxygen, not more than about 100 parts per million nitrogen, not more than about 3 parts per million hydrogen, and the balance iron, moving said arc along the prepared edges of said adjacent members at least once while maintaining said atmosphere to form a weld between said members, said weld being characterized by 100% joint efficiency in the transverse tensile test and by a Charpy V-notch value in the weld metal of at least 25 foot-pounds at minus 320° F.

References Cited by the Examiner
UNITED STATES PATENTS

| | | | |
|---|---|---|---|
| 2,451,469 | 10/1948 | Brophy et al. | 75—123 |
| 2,810,818 | 10/1957 | Rothschild et al. | 219—74 |
| 3,097,294 | 7/1963 | Kubli et al. | 219—145 |
| 3,162,751 | 12/1964 | Robbins | 219—145 |

RICHARD M. WOOD, *Primary Examiner.*